United States Patent [19]

Nash et al.

[11] Patent Number: 4,667,968

[45] Date of Patent: May 26, 1987

[54] DUAL-LIP GREASE-RETAINING AND DIRT-EXCLUDING SHAFT SEAL

[75] Inventors: Stephen E. Nash, Farmington Hills; Gerald P. Pichler, Dearborn; David R. Brooks, Milford, all of Mich.

[73] Assignee: Federal-Mogul Corporation, Southfield, Mich.

[21] Appl. No.: 716,516

[22] Filed: Mar. 26, 1985

Related U.S. Application Data

[63] Continuation of Ser. No. 578,861, Feb. 10, 1984, abandoned.

[51] Int. Cl.[4] .............................................. F16J 15/32
[52] U.S. Cl. ................................. 277/134; 277/153; 277/166
[58] Field of Search ........................... 277/1, 35–37, 277/44–52, 134, 152, 153, 166

[56] References Cited

U.S. PATENT DOCUMENTS

| | | | |
|---|---|---|---|
| 3,021,161 | 2/1962 | Rhoads et al. | 277/37 |
| 3,108,815 | 10/1963 | Haynie et al. | 277/37 |
| 3,179,424 | 4/1965 | Carson et al. | 277/37 |
| 3,362,719 | 1/1968 | McCormick | 277/37 |
| 3,495,843 | 2/1970 | Andersen et al. | 277/183 |
| 3,561,770 | 2/1971 | Corsi et al. | 277/35 |
| 3,685,841 | 8/1972 | Keller | 277/37 |
| 4,106,781 | 8/1978 | Benjamin et al. | 277/82 |
| 4,171,561 | 10/1979 | Bainard et al. | 277/153 X |
| 4,208,057 | 6/1980 | Messenger | 277/37 |
| 4,239,243 | 12/1980 | Bainard et al. | 277/153 |
| 4,243,235 | 1/1981 | Repella | 277/1 X |
| 4,285,526 | 8/1981 | Klintenberg et al. | 277/153 |
| 4,344,631 | 8/1982 | Winn | 277/29 |
| 4,399,998 | 8/1983 | Otto | 277/134 |

FOREIGN PATENT DOCUMENTS

| | | | |
|---|---|---|---|
| 328815 | 4/1976 | Austria . | |
| 3120795 | 2/1982 | Fed. Rep. of Germany . | |
| 3103319 | 12/1982 | Fed. Rep. of Germany . | |
| 1531683 | 5/1968 | France | 277/153 |
| 2456888 | 12/1980 | France | 277/134 |
| 2077371 | 12/1981 | United Kingdom | 277/152 |
| 2108596 | 5/1983 | United Kingdom | 277/153 |

Primary Examiner—Robert S. Ward
Attorney, Agent, or Firm—Robert F. Hess; Lawrence J. Shurupoff

[57] ABSTRACT

A unitized grease seal. The seal member has a one-piece metal case having a cylindrical bore-sealing portion and a radial flange, and a molded elastomeric member bonded to the metal case to provide a portion bonded to the radial flange and an outer generally cylindrical portion bonded to the surface of the bore-sealing portion and providing a series of spaced apart inwardly extending retaining portions. The elastomeric member also has two diverging lip portions with a cavity between them, one providing a grease retention lip having small spaced-apart shallow indentations enabling passage of small amounts of grease into the cavity, the other lip portion having a polytetrafluoroethylene insert bonded thereto. A one-piece metal wear sleeve member has a shaft-engaging cylindrical portion engaged by the lips and a radially outwardly extending flange with an axially inturned portion having an outer portion spaced radially inwardly from the outer generally cylindrical portion of the elastomeric member but extending radially outwardly beyond the radially inner extremities of the retaining portions. During assembly, the wear sleeve flange's inturned portion is snapped into the space between the retaining portions and the case's radial flange.

20 Claims, 8 Drawing Figures

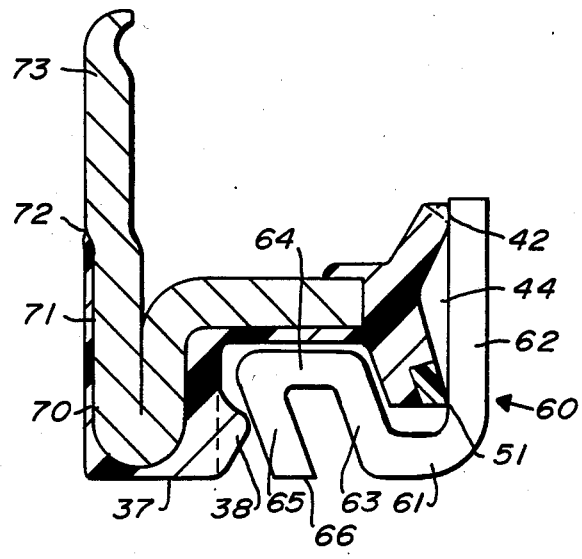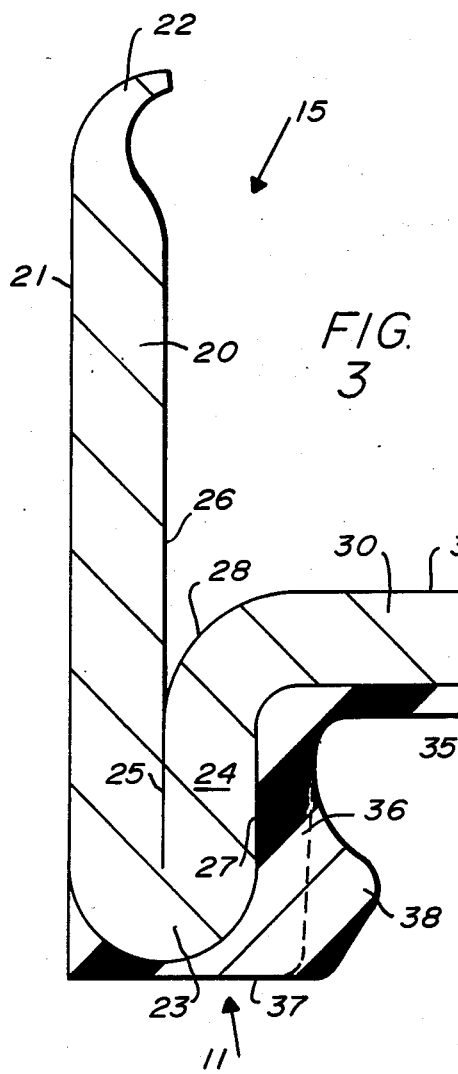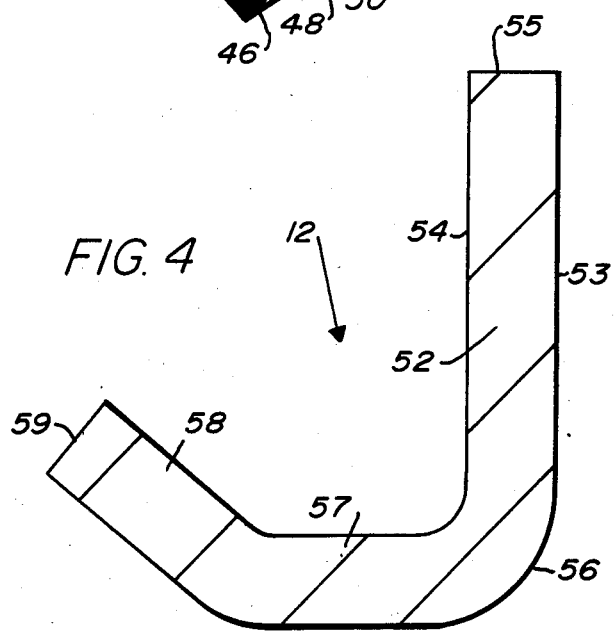

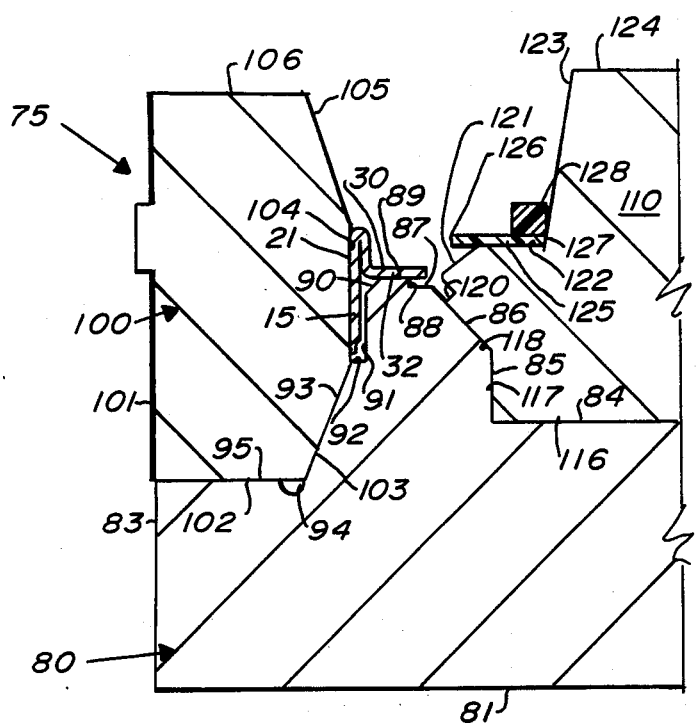
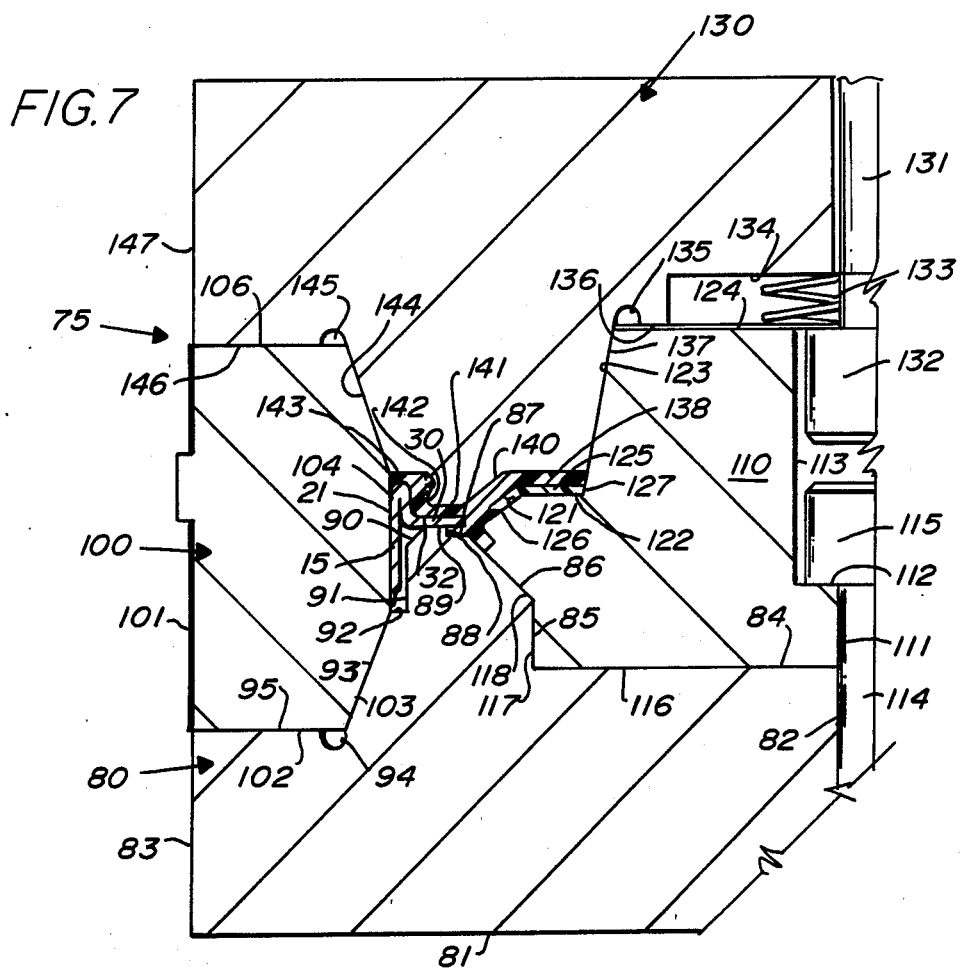

DUAL-LIP GREASE-RETAINING AND DIRT-EXCLUDING SHAFT SEAL

This application is a continuation of application Ser. No. 578,861, filed Feb. 10, 1984, now abandoned.

This invention relates to an improved dual-lip grease-retaining and dirt-excluding shaft seal.

BACKGROUND OF THE INVENTION

With customers demanding ever increasing quality and long life, automobile manufacturers have, in turn demanded more from the manufacturers of shaft seals. Some seals of the present invention are intended to be used on wheel spindles of automobiles, and to last without replacement for as long as 100,000 miles, while retaining the grease and excluding grit, dirt, corroding liquids, and so on. The seals heretofore made have not had so long a life. Moreover, the seal is required to be installable in a very small space.

Exclusion of deleterious foreign matter is even more important than the retention of the grease, as in certain applications grease may be added to the wheel bearings from time to time; in fact, it is desirable to have some grease flow out from the grease retaining seal lip into the space between the grease-retaining lip and the dirt excluding lip, so as to lubricate both lips. It is not even harmful to have a small amount of grease expelled via the dirt-excluding lip during lubrication of the wheel bearings. However, the amount allowed to pass the grease-retaining lip should be kept very small.

In any event, there tends to be more wear at the dirt-excluding lip; because that lip is quite likely to come into contact with dirt, grit, dust and corroding liquids. It is also desirable to fling the outside foreign matter outwardly in such a way that it tends not to work its way to the dirt-excluding lip, but even with such flinging, there will still be a substantial amount of deleterious foreign matter attempting to pass by the lip over a period of driving an automobile 100,000 miles.

U.S. Pat. Nos. 4,399,998 and 4,344,631 show some venting structure for seal lips, as does U.S. Pat. No. 2,830,832, but none of these vents is suitable for use in the present seal.

It is also important that the seal be unitized, because with a precision product of this kind and of this size, wrong or careless installation can immediately ruin the sealing lips and lead to the manufacturer's having to make good his guarantee on the wheel bearings. Assemblyline workers in automobile plants are often careless, and even though they may try to be careful, separate installation of a seal and then of a dirt flinging member or of a wear sleeve to go upon the shaft tends to produce misalignments which considerably shorten the life of the seal, and may in fact cause its ruin within a few miles of the running of the new car.

There are many unitized seal strucutres, including those shown in U.S. Pat. Nos. 3,021,161; 3,108,851; 3,179,424; 3,685,841; 3,561,770; 4,028,057; and 4,285,526, but few, if any, are applicable to a seal as narrow as that of the present invention. Some of the enumerated patents show dual-lip seals, but none like those of the present invention.

To insure long life at the dirt exclusion seal, a very long lasting seal composition is desirable. It is possible to make a seal having many of the features of the present invention by using only a standard high quality elastomer such as acrylic rubber, butyl rubber, or an ethylene acrylic rubber (e.g., Vamac ®, a DuPont ® Reg. Trademark). However, the use of polytetrafluoroethylene, or an equivalent material, at the actual sealing edges is highly desirable. The incorporation of polytetrafluoroethylene becomes important due to the fact that the temperature of the seal during use may rise to between 300° and 350° F. Also the pressure from the grease side of the seal may rise to the range of 50 to 60 p.s.i. at up to about 1200 rpm, which corresponds to vehicle speeds of 80 to 90 miles per hour. Polytetrafluoroethylene also reduces the torque of the seal on the wear sleeve.

Since polytetrafluoroethylene cannot be readily and economically molded to complex shapes, it usually must be incorporated into the seal by using a wafer-like washer, as by bonding it to an elastomeric supporting member. The present invention does this in novel manner employing a novel method of manufacture to produce a novel product. The method further includes features in addition to the incorporation of the polytetrafluoroethylene.

Polytetrafluoroethylene is shown bonded to elastomers in shaft seals in many patents, including U.S. Pat. Nos. 3,495,843 and 4,239,243 and East German Pat. No. 328,815, but, again the structure of the present invention and the method of producing it do not appear to be known.

SUMMARY OF THE INVENTION

The product of this invention is a unitized grease seal and comprises a dual-lip seal member and a wear-sleeve member attached together, preferably releasably.

The seal member comprises a one-piece metal case, a molded elastomeric member bonded to the metal case, and a polytetrafluoroethylene lip member bonded to the elastomeric member and providing the dirt-excluding sealing lip.

The case has a cylindrical outer portion defining a wall with an outer surface adapted to be press fitted into a stationary bore. If desired, part of the outer surface may be covered with elastomer, and this elastomer may be a portion of the elastomeric member. A reverse cylindrical portion extends back from one end of the outer wall and has an outer surface bearing against the inner surface of that wall. The reverse portion is much shorter than the outer portion, and from its inner end, a radial flange extends inwardly to a radially inner end. The flange has an outer face on the air side of the seal, continuous with the inner face of the reverse portion.

The molded elastomeric member is bonded to the metal case. Thus, a radially extending portion of the elastomeric member is bonded to the outer face of the radial flange, and an outer generally cylindrical portion is bonded to the inner surface of the reverse portion. This generally elastomeric cylindrical outer portion has a series of radially inwardly extending wear-sleeve-retaining portions spaced circumferentially from each other. An inner portion of the elastomeric member extends inwardly of the radially inner end of the case's radial flange, being bonded thereto, and has two diverging lip portions, meeting, as molded, at about 90° at a point spaced radially in from the inner end of the case, and there is a cavity in between these lip portions. One of these lip portions is on the grease side of the seal, and is has a grease-retention lip provided with a series of spaced-apart small relieved indentations enabling passage of small amounts of grease into the cavity. The other lip portion provides a dirt-excluding lip portion.

Preferably, it has a cylindrically extending recess therein, and a polytetrafluoroethylene sealing lip member fits into the recess and is bonded to the elastomeric member. This polytetrafluoroethylene lip preferably provides the sealing edge portion of that lip portion.

In addition to the seal member, there is a onepiece metal wear sleeve and deflector member having a radially inner, cylindrical, wear sleeve portion with an inner surface adapted to be press fitted on a rotatable shaft and an outer surface engaged by both of the sealing lips. The outer diameter of this cylindrical portion is greater than that of the as-made inner diameter of the sealing lips, so that assembly of the wear sleeve on the seal member causes further spreading-apart of the two lips. The dirt-excluding lip, when in position on the wear sleeve, has an end wall on its air side that is substantially perpendicular to the wear sleeve's outer surface, or as nearly perpendicular as is practical.

The wear sleeve member also has a unitizing radially outwardly extending flange portion serving as a deflector and slinger to protect the dirt-excluding lip from much of the foreign matter that otherwise come into contact with that lip. It also helps to unitize the assembly. Preferably its first extends radially outwardly from the air-side end of the wear sleeve's cylindrical portion and then turns in toward the radial flange of the case. Near or at its outer end, a portion is spaced inwardly from the outer, generally cylindrical portion of the elastomeric member but extends outwardly beyond the radially inner extremities of the elastomeric retaining portions, so that this deflector portion of the wear sleeve member can be snapped into the space between the elastomeric retaining portions and the elastomer-coated radial flange of the metal case.

The invention also includes a method for making the unitized dual-lip shaft seal.

It may begin by seating on a first mold member the one-piece metal case, its outer bore-engaging cylindrical portion being seated against a second mold member, appropriate parts of the case being covered with elastomerbonding cement. A third mold member is engaged with the first mold member so as to define between them a cavity for molding to finished size and shape the grease-facing lip, at an angle of about 45° to the radial flange. The third mold member is also shaped to provide a series of projections in the cavity that provide the spaced-apart indentations in the grease-retaining lip. This third mold member also provides one surface of the cavity for the dirt-excluding lip, this surface sloping in the opposite direction from the grease-lip cavity, at an angle of about 45° to the radial flange, so that the two cavities meet at about 90°. The sloping surface leads to a ledge spaced away from the radial flange and parallel to the plane thereof; the ledge ends at an inner cylindrical boundary.

A flat washer of polytetrafluoroetylene is placed on the ledge with the inner circumference of the washer engaging the boundary and the outer circumference extending beyond the ledge and overhanging a portion only of the sloping surface. Appropriate surface portions of the washer are treated beforehand, as by acid etching and then with bonding cement, to enhance the bonding of elastomer thereto.

A ring of uncured elastomer ("prep") is placed on top of the portion of the polytetrafluoroethylene washer supported by the ledge, and a fourth mold member is brought toward and against the second and third mold members to close the mold, all of the mold members being heated to a molding and curing temperature. Closing the mold defines the remainder of the mold cavity for the dirt-excluding lip and defines a further cavity for the radial portion next to said radial flange and the outer cylindrical portion of the elastomeric member. This outer cylindrical portion of the mold is shaped to provide a set of circumferentially spaced apart cavity portions extending radially inwardly to provide the wear-sleeve retention members. The movement of the fourth mold member simultaneously forces the elastomer to flow into all the mold cavities and also to flex the overhanging portion of the polytetrafluoroethylene washer into engagement with the sloping mold surface and to initiate bonding of the elastomer to the case and to the washer.

The elastomer is then cured under heat and pressure to a desired cure, so that it holds its shape and completes the bonding of the elastomer to the case and the washer. Thereby, it produces the shaft sealing member, which has a grease-retaining lip molded to its final shape and a dirt-excluding lip, which at that time has a portion extending generally inwardly therefrom; the shaft sealing member also has its molded set of wear-sleeve retention members spaced away from the case's radial flange. The mold is then opened and the shaft sealing member removed.

Next, the dirt-excluding lip is trimmed to a desired length, the edge being trimmed at a desired angle so that when the seal is unitized and the lips are spread apart, the trimmed edge is nearly parallel to the case's radial flange.

In addition, a one-piece metal wear sleeve is formed with a cylindrical portion for engagement with both sealing lips and of a diameter to spread apart those lips and, as a result, to move the trimmed edge to its aforementioned nearly-parallel position. The wear sleeve also has a shaped radially outwardly extending deflecting portion, of a size enabling unitization.

Then, the wear sleeve and shaft sealing member are assembled together. The sleeve's radially outwardly extending portion is placed on the air side of the shaft sealing member, and the lips are placed in engagement with the cylindrical portion of the wear sleeve. The radially outwardly extending portion is then snapped into the space between the elastomeric retention members and the elastomer-covered radial flange, so that the retention members thereafter hinder retraction of the wear sleeve from the shaft-sealing member, although it can, if desired, be taken off.

BRIEF DESCRIPTION OF THE DRAWINGS

FIG. 3 is a further enlarged view in cross section of the shaft seal element alone shown in its as-molded and trimmed position.

FIG. 4 is a similarly enlarged view of the wear sleeve.

FIG. 5 is a view similar to FIG. 2 of a modified form of the invention employing a differently shaped wear sleeve and a modified form of the outer portion of the outer seal of FIG. 2.

FIG. 6 is a view in section of approximately half of the lower parts of a mold for molding the shaft seal, shown with the mold open and the case, the polytetrafluoroethylene washer, and the raw elastomer placed in position.

FIG. 7 is a similar view of the mold in its closed position.

DESCRIPTION OF A PREFERRED EMBODIMENT

Figure 1:
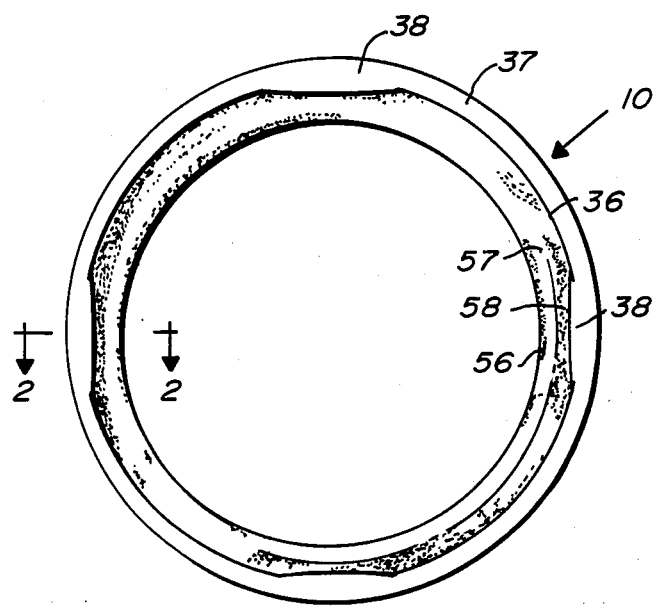
FIG. 1 is a view in end elevation of a unitized dual-lip shaft seal embodying the principles of the invention.
Figure 2:
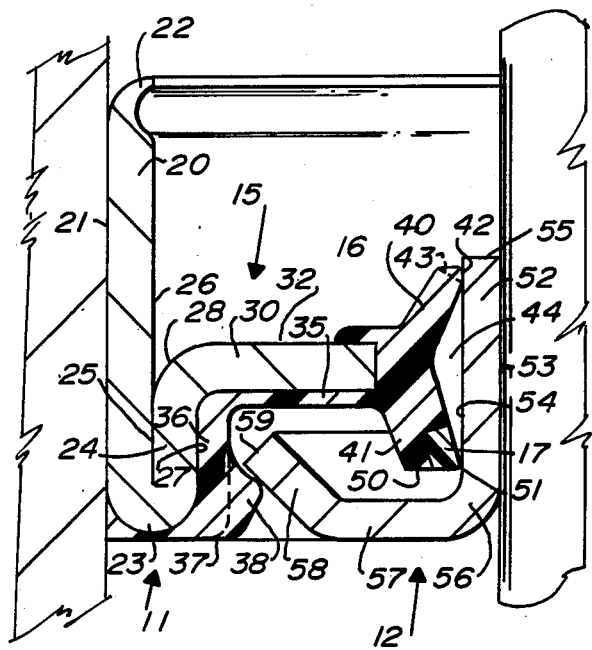
FIG. 2 is a greatly enlarged view in section of one portion of the seal taken along the line 2—2 in FIG. 1.

As shown in FIG. 1 a unitized seal 10 of the invention is a continuous annular device. As shown in FIGS. 1 and 2, the seal 10 comprises a sealing member 11, and a wear sleeve member 12, which are assembled together in a manner resulting in unitization, so that the seal is installed as a unitized assembly 10, rather than having separate installation of its two major components 11 and 12.

The elastomeric seal member 11 preferably comprises three major elements which are best seen in FIG. 3, which presents the as-molded and trimmed sealing member 11. This member 11 comprises a metal case member 15, an elastomeric member 16 which is bonded to the case 15, and a polytetrafluoroethylene insert 17 which is bonded to the elastomeric member 16.

The case 15 is a unitary annular metal member shaped to provide a cylindrical outer portion 20 having an outer surface 21 for leak-tight engagement in the bore of a housing. The outer surface 21 is preferably coated with a suitable bore-locking material, not shown. One end 22 of the portion 20 is free and the other end 23 is curved back on itself to provide a short inner cylindrical portion 24 with its outer surface 25 bearing against the inner periphery 26 of the portion 20. The portion 24 has an inner surface 27, and it is curved inwardly at its end 28 to provide a radial flange 30 having an outer or airside surface 31, an inner or grease-side surface 32, and a radially inner end 33. To this end 33 and to the inner portions of the surfaces 31 and 32 is bonded the elastomeric sealing element 16. The actual molding will be described later, in conjunction with FIGS. 6 and 7.

The elastomeric sealing element 16 may be of any suitable elastomer; it is a unitary member having a radially extending portion 36 bonded to the surface 31 of the radial flange 30, and an outer cylindrical portion 36 bonded to the surface 27 of the case 15. This cylindrical portion 36 is provided near its axial end 37 with a series, usually four, of inwardly directed projections 38 which provide short retaining members for holding the wear sleeve member 12 in its unitized position.

The radially inner portion of the elastomeric member 16 comprises two lip portions 40 and 41. The lip portion 40 comprises an as-molded lip edge 42 which need not be trimmed and which faces at an angle of about 45° away from the radial flange 30 of the case 15. It serves as the grease-retaining lip 40. Its lip edge 42 may have a slight curvature and is preferably provided with a series, preferably three, of short lip vents 43, which are equally spaced around the periphery, and may be, and preferably are, approximately 0.005" deep by 0.125" wide. The purpose of these vents 43 is to permit the entry of grease from the bearing member into a cavity 44 in between the two lips to keep the lips lubricated. The amount of grease desired there is relatively small, and therefore the vent passages 43 are quite small, so that they do not significantly interfere with grease retention.

The other sealing lip portion 41 is made considerably wider than the lip portion 40 to provide a good support for the polytetrafluoroethylene insert 17, which takes up approximately half the width of the lip portion 41 and which must be bonded to and securely retained by the elastomeric lip portion 41. Thus, the elastomer itself may be considered as having converging walls 45 and 46 and a recess having walls 47 and 48. Into the recess and flush with the walls 47 and 48 is the polytetrafluoroethylene member 17. The lip portion 41 and the tetrafluoroethylene member 17 have a common trimmed edge 50 which is not perpendicular to the wall 45 but is, instead, so trimmed that when the sealing member 11 is assembled on the wear sleeve member 12, the trimmed edge 50 will approach as closely as possible a right angle to the wear sleeve, as can be seen in FIG. 2. The limiting factor here is what the shape and dimensions of the seal enable the trimming knife to do without cutting any of the other parts. Typically this means that trim lies at an angle of about 30° to a plane parallel to the radial flange 30. The way in which the seal is made will be described later. In any event, the trimming results in an originally sharp sealing lip edge 51, that becomes blunted as the lip wears.

The wear sleeve member 12 is a formed metal member, preferably made from the kind of sheet steel usually used for this type of installation, typically treated with phosphoric acid or some similar solution. This member 12, as shown in FIG. 4, has a wear sleeve 52 proper, the inner periphery 53 of which fits snugly on a shaft, while its outer periphery 54 serves as the surface upon which the seal lips 42 and 51 run, as can be seen in FIG. 2. One end 55 facing the bearing is a free end, while at the other end 56 the wear sleeve member 12 is curved outwardly to provide a radially extending portion 57 followed by an angularly extending portion 58 that goes back in axially, toward the opposite end 55, terminating at an end 59. The ends 55 and 59 are cut off before the forming. The angular portion 58 is shown extending at an angle of about 45° to the radial portion 57, and the end 59 lies out beyond the projections 38 but spaced out from the inner surface of the cylindrical portion 36. Thus, the outer periphery 59 can be snapped into the four or more proptuberances or retaining members 38 to unitize the seal 10. The spacing apart of the members 38 and the flexibility of the elastomer make assembly a very simple matter.

When the members 11 and 12 are assembled to complete the seal 10 (FIG. 2) the two lips 42 and 51 are spread apart more widely than before (FIG. 3), and the cavity 44 between them is somewhat reduced in height, but is spread in width. The recesses 43 for admitting grease into the cavity 44 are operative, and the polytetrafluoroethylene sealing member 17 has its axially outer edge 50 substantially parallel to the radial portion 57 of the wear sleeve member 12, as well as to the radial flange 30 of the seal case 15.

The portions 57 and 58 of the wear sleeve member 12 act as a deflector and as a slinger, to free the seal as much as possible from water and corrosive liquids, as well as from dirt and dust.

To obtain somewhat better operation of this slinging-deflecting feature, the wear sleeve structure 60 shown in FIG. 5 may be used, although it is more difficult to form and therefore somewhat more expensive. In this instance, after a short radial portion 61 at the end of the wear sleeve proper 62, the metal has a portion 63 bent inwardly axially toward the opposite end of the wear sleeve 62, at approximately 90° and then has a bent-out portion 64 lying parallel to the radial flange 30, when installed, and then a final portion 65 is bent back at an acute angle to bring its end 66 out within the inner diameter of the retention members 38. This bending back results in leaving axially inside the members 38 the part of the portion 65 which is of greater diameter than the retaining members 38, though of lesser diameter than the cylindrical surface 36 from which the retaining members 38 project. This structure provides an improved slinging action, while taking up no more room. However, its practicality depends partly on the necessity for any greater slinging action, and on the additional costs involved.

As would probably be apparent anyway, the exterior part of the case 16 may be at least partially coated with elastomer, as is also shown in FIG. 5. Here, an outer portion 70 of the elastomer is formed to cover the exterior surface 71 of an inwardly stepped portion 72 of the case. The rubber coating 70, since it is able to accommodate itself to the bore diameter by some flow towards its end, is made a litter larger in diameter than the remaining portion 73 of the bore-engaging portion of the metal case.

Going now to the method of manufacture of the seal, a preferred such method incorporates a four-piece mold 75 as shown in FIGS. 6 and 7. The mold 75 is shown in a particular orientation which will be used for description, although a different orientation is possible. A stationary mold base 80 is shaped to provide a bottom planar surface 81 with an inner cylindrical surface 82 and an outer cylindrical surface 83. The inner cylindrical surface 82 leads up to a horizontal planar annular surface 84, which, in turn, leads out to a short cylindrical surface 85, and then to an inclined frustoconical portion 86. At the outer end of the portion 86 is a shelf 87 connected by a step 88 to a short case-engaging planar rest 89. From there, a radius portion 90 leads to a cylindrical portion 91 terminating at a planar shoulder 92. The outer edge of the shoulder 92 terminates at a frustoconical outer surface 93, at the lower end of which is a flash trap 94 followed by a planar shelf 95 leading to the outer cylindrical surface 83.

A second, outer, mold member 100 is placed partly around and partly upon the base mold member 80. It has an outer generally cylindrical surface 101 and a lower flat annular face 102 which engages the annular shelf 95. It also has a frustoconical surface 103 bearing against the frustoconical surface 93 of the first mold member 80. Above that is a short cylindrical portion 104 going up to another frustoconical surface 105 that leads to an upper planar face 106 extends out to its outer surface 101.

The metal case 15 is preferably placed with its outer surface 21 bearing against the cylindrical portion 104 of the mold member 100 and with the surface 32 of its radial flange 30 resting upon the rest 89, while most of the inside surface 26 of the case portion 15 is spaced away from the cylindrical portion 91.

A third, inner, mold member 110 has a stepped generally cylindrical inner through opening with a lower cylindrical surface 111, a step 112, and an upper cylindrical surface 113. A mold pin 114 has a head 115 engaging the step 112 and forcing a lower annular face 116 of the mold member 110 snugly against the annular surface 84. A cylindrical face 117 engages the cylindrical surface 85, and a frustoconical surface 118 engages and overlies the frustoconical surface 86 of the first mold member 80. However, the upper and outer end of the surface 118 is shaped to provide a cavity 120 between the two mold members 80 and 110 adjacent to the shelf 87. The cavity 120 provides the as-molded grease-retaining lip portion 40. At its upper end, the cavity 120 is terminated, and a frustoconical portion 121 leads upwardly to an inwardly extending ledge 122. The ledge 122 then leads to a nearly cylindrical tapered portion 123 ending in an annular planar portion 124 which leads in to the inner periphery on the upper cylindrical surface 113.

A polytetrafluoroethylene washer 125, which preferably has been acid etched on one surface is provided with a coating of bonding cement there and on its outer periphery 126, and is placed on top of the ledge 122, with the etched and coated surface facing up and with its inner periphery 127 abutting the tapered portion 123. The washer 125 extends out beyond the ledge 122 and overhangs a portion of the frustoconical surface 121. Atop the washer 125 is placed a ring 128 of uncured elastomer calculated to provide the proper amount for filling the molded cavities provided for the elastomer.

A fourth or upper mold member 130 is attached to an upper mold pin 131 having a head 132 that partially compresses a series of springs 133 against a lower shoulder 134 of the member 130. Like the first mold member 80, the member 130 has a flash receiving cavity 135 at the outer end of a planar lower face portion 136 and at the inner end of a tapered portion 137 that mates with the tapered portion 123 of the third mold member 110 when the mold 75 is in its closed position. At the lower end of the tapered portion 137 is a planar annular surface 138 leading to a frustoconical portion 140, the surfaces 138 and 140 defining part of the mold cavity for the dirtexcluding lip 41. The surface 140 is succeeded by a short radial portion 141 followed by a cylindrical step 142 leading to a short annular planar surface 143, from the outer end of which a tapered portion 144 leads outwardly and upwardly. The tapered portion 144 mates with the tapered portion 105 of the second mold member 100 and has another flash-receiving cavity 145 at its outer end. Beyond that is a planar surface 146 that mates with the surface 106 of the second mold member 100 and leads to an outer cylindrical surface 147.

When the heated mold is closed during the progress from the position shown in FIG. 6 to that of FIG. 7, the mold cavities are defined, and simultaneously the elastomer is caused to flow thereinto. If there is any excess elastomer it flows into the flash-receiving cavities 135 and 145. This flash is relatively easily removed from the molded seal. However, no flash forms on the as-molded lip 40. During this operation the elastomer and the fourth or upper mold member 130 act upon the polytetrafluoroethylene washer 125 to force its overhanging portion flush against the frutoconical surface 121 while bonding the elastomer to it. After the mold 75 is closed, it is held closed until cure of the elastomer has been completed, and then it is parted and the sealing member is ejected by conventional means.

Figure 8:
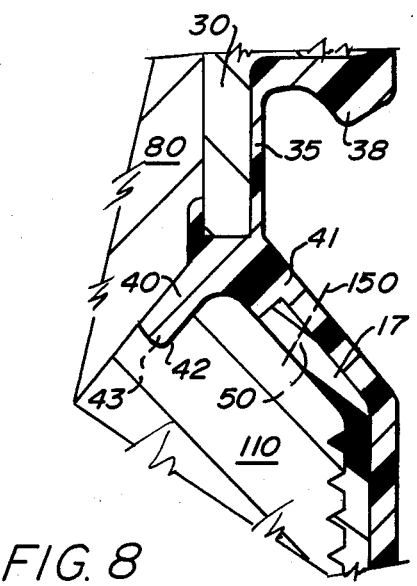
FIG. 8 is a fragmentary enlarged view in section of a portion of FIG. 7, showing the seal as molded and indicating the trim line.

As will be seen from the mold drawing, the inner portion of the polytetrafluoroethylene washer 125 and the elastomer there must be trimmed off. The trimming is along the line 150 in FIG. 8, leaving the edge 50 shown in Fig. 3, so that the inner periphery of the lip edge 52 is smaller in diameter than that of the grease-retaining lip edge 51, the trimming being made, as stated before, at an angle of about 30° to the plane of the radial flange 30 and, in any event, such that the surface 50 will become nearly a right angle when the seal is unitized.

The wear sleeve member 12 is made by conventional forming means to the desired shape, and is, as already been said, snapped into the oil seal member 11, so that the retaining members 38 thereafter hold it in place. The seal assembly 10 can, if actually needed, taken apart, but this if far from normal, and it is almost always left together. It will not come apart accidentally because of the retention members 38.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in a sense limiting.

What is claimed is:

1. A unitized grease seal, including in combination:
    a seal member having
    a one-piece metal case having a cylindrical bore-sealing portion with an inner surface and an inwardly extending radial flange, in between the ends of said bore-sealing portion, having a radially inner end, an air-side radial surface, and an opposite grease-side radial surface,
    a molded elastomeric member bonded to said metal case and having a radially extending portion bonded to said air-side radial surface, an outer generally cylindrical portion bonded to said inner surface of the bore-sealing portion on the air side of said flange and providing a series of radially inwardly extending retaining portions spaced circumferentially from each other, and
    said elastomeric member also having an inner portion extending radially inwardly of said inner end of said radial flange and having two diverging lip portions with a cavity between them, one said lip portion providing a grease retention lip having small spaced-apart shallow indentations enabling passage of small amounts of grease into said cavity, the other said lip portion having a polytetrafluoroethylene insert bonded to said elastomeric member and providing the sealing edge portion of a dirt-excluding lip, and
    a one-piece metal wear sleeve member having a radially inner shaft-engaging cylindrical portion having an outer surface engaged by said lips and having a larger outer diameter than the free-standing inner diameter of said lips, so that assembly of the wear sleeve on the seal member causes further spreading-apart of said two lips, said dirt-excluding lip when in position on said wear sleeve having an end wall on its air side that is substantially perpendicular to said wear sleeve's outer surface,
    said wear sleeve member also having a radially outwardly extending flange on its air-side end, with an axially inturned portion having an outer portion spaced radially inwardly from the outer generally cylindrical portion of said elastomeric member but extending radially outwardly beyond the radially inner extremities of said retaining portions, so that during assembly, the wear sleeve flange's inturned portion can be snapped into the axially extending space between said retaining portions and the elastomer-covered radial flange.

2. The grease seal of claim 1 wherein said wear sleeve's flange has a truly radial portion where it meets said cylindrical wear sleeve portion, extending beyond said end wall of said dirt-excluding lip followed by an angularly flange and ending at its radially outermost, axially innermost point.

3. The grease seal of claim 1 wherein said wear sleeve's flange has a truly radial portion where it meets the wear sleeve's cylindrical portion, extending beyong said dirt-excluding, lip followed by an axially inwardly extending portion going toward said case's radial flange, followed by a radially extending portion parallel to said case's radial flange and extending out radially beyond said retaining portions, followed by an axially outwardly and radially inwardly extending angular portion ending substantially flush axially with the end of said bore-sealing portion and radially within said retainer portions.

4. A unitized dual-lip grease seal, including in combination:
    a seal member having
    a one-piece metal case with a cylindrical bore-sealing portion having an inner surface and an inwardly extending radial flange, in between the ends of said bore-sealing portion, having a radially inner end, an air-side radial surface and an opposite grease-side radial surface,
    a molded elastomeric member bonded to said metal case and having a radially extending portion bonded to and completely covering said air-side radial surface, an outer generally cylindrical portion bonded to and covering that portion of said inner surface of the bore sealing portion which lies on the air side of said flange and providing a series of radially inwardly extending retaining portions spaced circumferentially from each other,
    said elastomeric member also having an inner portion extending radially inwardly of said inner end and bonded thereto and having two diverging lip portions, meeting, as molded, at about 90° at a point spaced radially in from said inner end and with a cavity between them, one said lip portion providing a grease retention lip and the other dirt-excluding lip, and
    a one-piece metal wear sleeve member having a radially inner shaft-engaging cylindrical portion having an outer surface engaged by said lips and having a larger outer diameter than the free-standing inner diameter of said lips, so that assembly of the wear sleeve on the seal member causes further spreading-apart of said two lips, said dirt-excluding lip when in position on said wear sleeve having an end wall on its air side that is substantially perpendicular to said wear sleeve's outer surface,
    said wear sleeve member also having a radially ouwardly extending flange on its air side end, with an axially inturned portion having a radially outermost portion spaced inwardly from the outer generally cylindrical portion of said elastomeric member but extending radially outwardly beyond the radially inner extremities of said retaining portions, so that, during assembly, the wear sleeve flange's inturned portion can be snapped into the space between said retaining portions and the elastomer-covered radial flange.

5. The grease seal of claim 4 wherein said grease-retaining lip is provided with spaced-apart shallow indentations.

6. The grease seal of claim 4 wherein said dirt-excluding lip has a polytetrafluoroethylene insert bonded thereto and providing the sealing edge.

7. A unitized grease seal, including in combination:
    a seal member having a one-piece metal case with a cylindrical outer portion defining a wall with an outer surface adapted to be press-fitted into a stationary bore and an inner surface, a reverse cylindrical portion extending back from one end of said wall and having an outer surface bearing against said inner wall surface and an inner surface, said reverse portion being much shorter than said outer portion, and an inwardly extending radial flange leading from the axially inner end of said reverse portion and having a radially inner end, an outer face on the air side of said seal and continuous with the inner face of said reverse portion, and an opposite inner face on the grease side of said seal, a molded elastomeric member bonded to said metal case and having a radially extending portion bonded to and covering said outer face of said radial flange, an outer generally cylindrical portion bonded to and covering the inner surface of said reverse portion and providing a series of radially inwardly extending retaining portions spaced circumferentially from each other, said elastomeric member also having an inner portion extending radially inwardly of said radially inner end of said radial flange and bonded thereto and having two diverging lip portions, meeting, as molded, at about 90° at a point spaced radially in from said inner end and with a cavity between them, one said lip portion being on the grease side of the seal and having a grease-retention lip provided with a series of spaced-apart shallow indentations enabling passage of small amounts of grease into said cavity, the other said lip portion providing a dirt-excluding lip portion having a cylindrically extending recess therein, and a polytetrafluoroethylene sealing lip member fitting in said recess and bonded to said elastomeric member and providing the sealing edge portion of said dirt excluding lip, said lip having an end wall on its air side, a one-piece metal wear sleeve member having a radially inner cylindrical portion with an inner surface adapted to be press fitted on a rotatable shaft and an outer surface engaged by both said lips and having a larger outer diameter than the inner diameter of said lips before assembly with said wear sleeve member, so that assembly of the wear sleeve on the seal member causes further spreading-apart of said two lips, the end wall of said dirt-excluding lip, when said lip is in position on said wear sleeve being substantially perpendicualr to said wear sleeve's outer surface, said wear sleeve member also having a flange portion extending radially outwardly from the air side end of the wear sleeve's cylindrical portion and an inturned portion at an angle to said radial flange and extending axially toward said case's radial flange and having an outer end spaced radially inwardly from the outer generally cylindrical portion of said elastomeric member but extending radially outwardly beyond the radially inner extremities of said retaining portions, so that the inturned portion of said wear sleeve member can be snapped into the space between said retaining portions and said radial flange of said metal case.

8. The crease seal of claim 7 wherein said wear sleeve's flange has a truly radial portion where it meets said cylindrical wear sleeve portion, extending beyond said end wall of said dirt-excluding lip followed by an angularly extending portion, going toward said case's radial flange and ending at its radially outermost, axially innermost point.

9. The grease seal of claim 7 wherein said wear sleeve's flange has a truly radial portion where it meets the wear sleeve's cylindrical portion, extending beyond said dirt-excluding lip, followed by an axially inwardly extending portion going toward said case's radial flange, followed by a radially extending portion parallel to said case's radial flange and extending out radially beyond said retaining portions, followed by an axially outwardly and radially inwardly extending angular portion ending substantially flush axially with the end of said bore-sealing portion and radially within said retainer portions.

10. The grease seal of claim 7 wherein said cylindrical outer portion is stepped and said elastomeric member has a portion extending from said outer generally cylindrical portion to the outer surface of said wall and bonded thereto to provide a bore-engaging outer periphery.

11. A unitized grease seal, comprising:

a case member having a cylindrical bore sealing portion with an inner surface and an inwardly extending radial flange, said flange having a radially inner end, an air-side radial surface, and an opposite grease side radial surface;

molded elastomeric means provided on said case member and having an outer generally cylindrical portion provided on said inner surface of said bore sealing portion on the air side of said flange;

flexible retaining means connected to said case member for unitizing said grease seal, said retaining means having a radial inner extremity;

a pair of diverging lip portions provided on said elastomeric means, one portion of said pair providing a grease retention lip, the other portion of said pair having a polytetrafluoroethylene insert secured therein and providing a sealing edge portion of a dirt-excluding lip;

a rigid wear sleeve member having an outer surface engaged by said lip portions such that assembly of the wear sleeve member with the case member causes spreading-apart of said lip portions; and engagement means provided on said wear sleeve member, said engagement means extending radially outwardly and spaced radially inwardly from said outer generally cylindrical portion of said elastomeric means and extending radially outwardly beyond said radial inner extremity of said retaining means, so that as assembled said wear sleeve is releasably engaged with said case member within an axially extending space between said retaining means and said radial flange.

12. The grease seal of claim 11, wherein said radial flange is disposed between opposite end portions of said cylindrical bore sealing portion.

13. The grease seal of claim 11, wherein said elastomeric means further comprises a radially extending portion provided on the air-sided radial surface of said flange.

14. The grease seal of claim 11, wherein said retaining means comprises a series of radially inwardly extending retaining portions spaced circumferentially from each other around said case member.

15. The grease seal of claim 11, wherein said elastomeric means comprises an inner elastomeric portion extending radially inwardly of said inner end of said flange, such that said inner elastomeric portion forms said pair of diverging lip portions.

16. The grease seal of claim 11, wherein said grease retention lip is formed with a plurality of small spaced-apart shallow indentations enabling passage of small amounts of grease into said cavity.

17. The grease seal of claim 11, wherein said wear sleeve member has a larger outer diameter than the free-standing inner diameter of said lip portions.

18. The grease seal of claim 11, wherein said dirt-excluding lip portion, when in position on said wear sleeve member, comprises an end wall on its air side that is substantially perpendicular to said outer surface of said wear sleeve member.

19. The grease seal of claim 11, wherein said engagement means comprises a radially outwardly extending flange on its air-side end, with an axially inturned portion, said outwardly extending flange having an outer portion spaced radially inwardly from the outer generally cylindrical portion of said elastomeric means.

20. The grease seal of claim 19, wherein said retaining means comprises a series of radially inwardly extending retaining portions and wherein said radially outwardly extending flange extends radially outwardly beyond the radial inner extremity of said retaining portions so that during assembly, the axially inturned portion of said outwardly extending flange can be snap-fitted into engagement with said retaining portions of said retaining means to unitize said grease seal.

* * * * *

UNITED STATES PATENT AND TRADEMARK OFFICE
CERTIFICATE OF CORRECTION

PATENT NO. : 4,667,968
DATED     : May 26, 1987
INVENTOR(S) : Stephen E. Nash, Gerald P. Pichler and David R. Brooks It is certified that error appears in the above—identified patent and that said Letters Patent is hereby corrected as shown below:

Column 5, line 42 after "portion" "36" should read "35".

Column 5, line 60 after "bearing" "member" should read "chamber".

Column 7, line 13 after "case" "16" should read "15".

Column 9, line 67 after "angularly" add "extending portion, going toward said case's radial".

Signed and Sealed this

Sixteenth Day of February, 1988

Attest:

DONALD J. QUIGG

Attesting Officer

Commissioner of Patents and Trademarks